United States Patent
Yamada (10) Patent No.: US 7,934,514 B2
(45) Date of Patent: *May 3, 2011

(54) FUEL CUTOFF VALVE

(75) Inventor: Norihiro Yamada, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 350 days.

This patent is subject to a terminal disclaimer.

(21) Appl. No.: 11/806,867

(22) Filed: Jun. 5, 2007

(65) Prior Publication Data

US 2007/0284001 A1   Dec. 13, 2007

(30) Foreign Application Priority Data

Jun. 13, 2006   (JP) .................. 2006-163011

(51) Int. Cl.
*F16K 24/04*   (2006.01)

(52) U.S. Cl. .......... 137/202; 137/43

(58) Field of Classification Search ............ 137/43, 137/171, 197, 199, 202, 409, 429, 430, 433
See application file for complete search history.

(56) References Cited

U.S. PATENT DOCUMENTS

| | | | | |
|---|---|---|---|---|
| 4,753,262 A * | 6/1988 | Bergsma | ............ | 137/39 |
| 5,172,714 A * | 12/1992 | Kobayashi et al. | ............ | 137/39 |
| 5,638,856 A | 6/1997 | Ohsaki | | |
| 7,527,064 B2 * | 5/2009 | Kito et al. | ............ | 137/39 |
| 2002/0112757 A1 * | 8/2002 | DeCapua et al. | ............ | 137/202 |

FOREIGN PATENT DOCUMENTS

| | | |
|---|---|---|
| JP | 3331269 | 7/2002 |
| JP | A-2005-297787 | 10/2005 |

* cited by examiner

*Primary Examiner* — Craig M Schneider
*Assistant Examiner* — Eric Sporer
(74) *Attorney, Agent, or Firm* — Posz Law Group, PLC (57) ABSTRACT

A fuel cutoff valve comprises a casing having a seal portion disposed facing a connecting passage and projecting in annular configuration towards a valve chamber; and a float mechanism having a float which rises and falls due to increasing and decreasing buoyancy according to the fuel level within the valve chamber. The float comprises a flexural depression-enabling recess situated on its upper surface at a location in opposition to the seal portion, for enabling the seat portion to undergo flexural depression when pressed by the seal portion. The casing has a regulating portion on the outside perimeter of the seal portion, for regulating the level of elastic deformation at which the seat portion elastically deforms into the flexural depression-enabling recess.

12 Claims, 6 Drawing Sheets

FUEL CUTOFF VALVE

This application claims the benefit of and priority from Japanese Application No. 2006-163011 filed Jun. 13, 2006, the content of which is incorporated herein by reference.

BACKGROUND OF THE INVENTION

1. Field of the Invention

The present invention relates to a fuel cutoff valve that is mounted on an upper wall of a fuel tank and opens and closes a connecting passage to connect the fuel tank and outside.

2. Description of the Related Art

On the upper part of a fuel tank, provided is a vaporized fuel processing device equipped with a full-fuel control valve and a fuel cutoff valve (roll over valve) connected to a canister, and by each valve being opened and closed at prescribed fuel fluid levels, air flow to outside the fuel tank is secured, and outflow of the liquid fuel to outside is prevented. The roll over valve cuts off fuel to outside at the fuel fluid level above the full tank fluid level to prevent fuel leakage such as when the vehicle is on a slope, when the vehicle is driving in slalom form, and the like.

However, in recent years, to deal with the varied and large space occupied in vehicles, flattening of fuel tanks has been studied, but with the kind of flattened fuel tank, to make the ratio of the dead space at the upper part of the fuel tank smaller, it is preferable to set the fuel fluid level at which the valve closes as high as possible. However, when the fuel fluid level during closing of the valve is set high, it is easy for the roll over valve to be immersed in fluid. Even in the case of the kind of fluid immersion, as shown in Japanese Pat. No. 3331269, known are means whereby to obtain high sealing properties, a rubber valve body is mounted on the center upper part of a float, and when the rubber valve plug is closing the connection path, the outer periphery of the rubber valve plug is flexibly deformed.

However, it is necessary for the rubber valve body to be rather thin so that the rubber valve body can undergo elastic deformation. The thin rubber valve body creates the problem of deterioration of the rubber valve body over time due to repeated elastic deformation.

SUMMARY

An advantage of some aspects of the invention is provided with a fuel cutoff valve that affords high sealing property using a flexible valve body of rubber or the like, and endowed with outstanding durability as well.

According to an aspect of the invention, the present invention is provided with a fuel cutoff valve that is mounted on an upper wall of a fuel tank, and opens and closes a connecting passage to connect the fuel tank and outside. The fuel cutoff valve comprising a casing having a valve chamber which connects the fuel tank interior to the connecting passage, and a seal portion disposed facing the connecting passage and projecting in annular configuration towards the valve chamber; and a float mechanism having a float housed within the valve chamber and which rises and falls according to a fuel level within the valve chamber, and a seat member installed on an upper portion of the float and having a seat portion formed of flexible material for opening and closing the connecting passage. The float includes a flexural depression-enabling recess situated on the upper portion of the float at a location in opposition to the seal portion for enabling the seat portion to undergo flexural depression when the seat portion is pressed by the seal portion, and the casing has a regulating portion formed on an outer circumference of the seal portion, for regulating a level of elastic deformation at which the seat portion elastically deforms into the flexural depression-enabling recess.

In a fuel tank employing the fuel cutoff valve in accordance with the present invention, when the fuel being supplied to the tank reaches a prescribed liquid level in the fuel tank, the float will rise due to buoyancy by means of fuel flowing into the valve chamber. Due to rising of the float, the seat member now closes off the connecting passage, cutting off the fuel tank from the outside and preventing fuel from spilling from the tank to the outside.

When the flexible seat member is seated on the seal portion, the portion of the seat member pressed against the seal portion undergoes elastic deformation towards the flexural depression-enabling recess on the upper surface of the float. At this time the flexural depression-enabling recess functions as a space permitting intrusion of the seat portion and producing reliable elastic deformation of the seal portion. Consequently, under pressure by the seal portion the seat portion undergoes elastic deformation producing intimate contact, so that high sealing property is achieved even when subjected to vibration of the vehicle.

With the seat portion of the seat member elastically deformed and seated on the seal portion, the upper surface of the seal member comes into abutment against the regulating portion which regulates the upward movement of the float, and thus the seat portion will not be stretched to any further extent by the seal portion. That is, the regulating portion, by means of regulating the level of elastic deformation of the seat portion, prevents the seat portion from being subjected repeatedly to high levels of elastic deformation, thus affording outstanding endurance.

In a preferred embodiment of the present invention, an arrangement wherein a plurality of the regulating portions are disposed in the circumferential direction so as to encircle the outside perimeter of the seal portion may be employed. By means of such an arrangement, the area of contact between the rubber seal member and the regulating portions may be kept small, preventing locking or sticking to the seal portion.

In another preferred embodiment of the present invention, an arrangement wherein the float comprises a valve support aperture at the axial center of the float; the seat member has a seat support portion projecting from the back surface of the seat portion; and the seat support portion is mounted on the float by inserting the seat support portion into the valve support aperture may be employed. By means of such an arrangement, the seat member can be installed on the float easily.

In yet another preferred embodiment of the present invention, the seat portion may be configured so as to contact the upper surface of the float. By means of such an arrangement, the seat portion undergoes flexural depression into the flexural depression-enabling recess produced by recessing a portion of the upper surface of the float, obviating need to provide a gap between the upper surface of the float and the seat portion of the seat member for the purpose of enabling flexural depression of the seat portion, thus avoiding bulkiness in the height direction of the float mechanism and contributing to a more compact design. Additionally, since the seat member is attached in a stable attitude in contact against the upper surface of the float, a high degree of surface accuracy of the seat portion vis-à-vis the seal portion is possible, and thus sealing property can be improved.

These and other objects, features, aspects, and advantages of the present invention will become more apparent from the following detailed description of the preferred embodiments with the accompanying drawings.

DESCRIPTION OF THE PREFERRED EMBODIMENTS

(1) General Arrangement of Fuel Cutoff Valve 10

Figure 1:
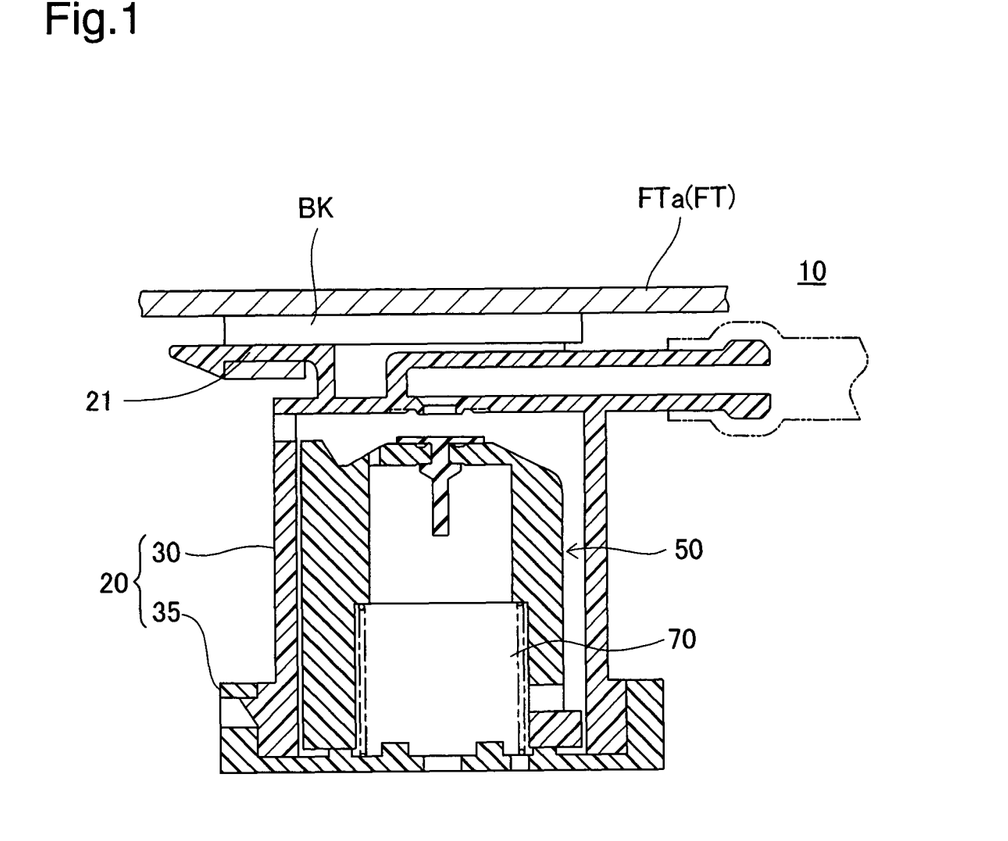
FIG. 1 is a sectional view showing a fuel cutoff valve attached to the upper part of the fuel tank of an automobile in one embodiment of the present invention.

FIG. 1 is a sectional view showing a fuel cutoff valve 10 attached to the upper part of a fuel tank FT of an automobile in one embodiment of the present invention. The fuel cutoff valve 10 is of so-called in-tank type installed in the interior of the fuel tank FT; it functions as a valve for restricting flow of fuel to the outside in the event of a rise in fuel level within the fuel tank FT when the vehicle leans or turns sharply for example. The fuel cutoff valve 10 comprises as its principal parts a casing 20, a float mechanism 50, and a spring 70. A valve mounting portion 21 is integrally formed on the upper part of the casing 20, and is attached to the inside of the fuel tank FT via a bracket BK which has been welded to the lower face of the tank upper wall FTa of the fuel tank FT.

(2) Arrangement of Parts of Fuel Cutoff Valve 10

Figure 2:
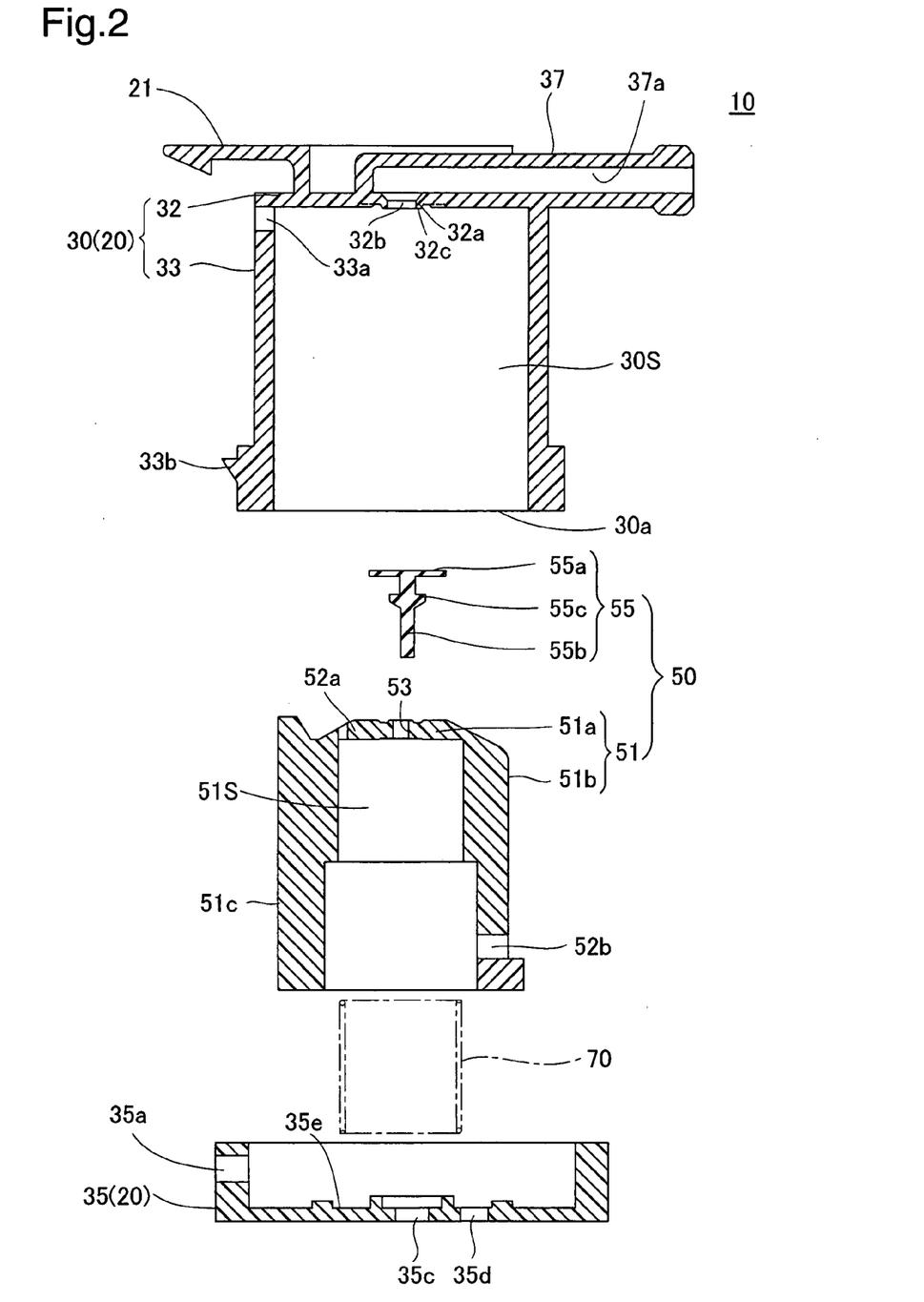
FIG. 2 is an exploded sectional view of the fuel cutoff valve.

FIG. 2 is an exploded sectional view of the fuel cutoff valve. In FIG. 2, the casing 20 comprises a casing body 30, and a base plate 35 installed on the bottom of the casing body 30. The casing body 30 comprises an upper wall 32 and a side wall 33 extending in cylindrical shape downward from the upper wall 32, forming a cup-shaped valve chamber 30S surrounded by the upper wall 32 and the side wall 33, and having a bottom opening 30a at the bottom end. A connecting passage-forming projection 32a is formed projecting downwardly from the center portion of the upper wall 32, and the connecting passage-forming projection 32a is perforated by a connecting passage 32b that connects to the valve chamber 30S, with the valve chamber 30S side of the connecting passage 32b constituting an annular seal portion 32c. In the upper part of the side wall 33 is formed a vent hole 33a that connects the fuel tank FT interior with the valve chamber 30S; in the lower portion is formed a fastening claw 33b. The fastening claw 33b is formed for attaching the base plate 35. The base plate 35 is a component for closing the bottom opening 30a of the casing body 30; by engaging the fastening claw 33b of the casing body 30 with a fastening hole 35a formed in the outside peripheral portion of the base plate 35. The base plate 35 is attached to the casing body 30 to close the bottom opening 30a of the casing body 30. The base plate 35 is perforated by a central communicating hole 35c and a communicating hole 35d surrounding the communicating hole 35c. These communicating holes 35c, 35d are formed so as to lie in opposition to the lower face of the float mechanism 50. A spring support portion 35e for supporting the lower end of a spring 70 is formed on the upper face of the base plate 35.

In the upper part of the casing body 30A is formed a pipe portion 37 that projects outwardly to the side from the center.

A pipe passageway 37a is formed inside the pipe portion 37. The pipe passageway 37a connects at a first end thereof to the valve chamber 30S via the connecting passage 32b of the casing body 30, and at the other end to the canister side.

Figure 3:
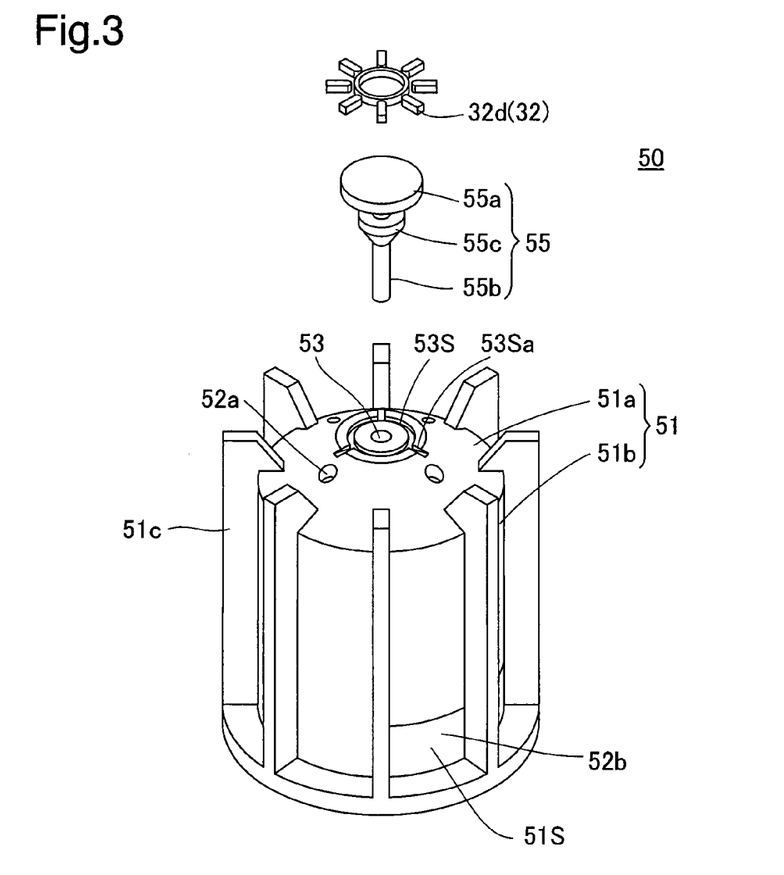
FIG. 3 is an exploded perspective view of the float mechanism.

FIG. 3 is an exploded perspective view of the float mechanism 50. In FIG. 2 and FIG. 3, the float mechanism 50 comprises a float 51, and a seat member 55 installed on top of the float 51. The float 51 is designed with receptacle shape including an upper wall 51a, and a side wall 51b of tubular shape extending downwardly from the periphery of the upper wall 51a; the interior space thereof constitutes a float chamber 51S for producing buoyancy. Eight Guide ribs 51c are formed on the outside periphery of the float 51. The guide ribs 51c are formed at an interval around the circumference of the side wall 51b of the float 51, and project in rib configuration in the vertical direction.

Upper vent holes 52a are formed in the upper wall 51a of the float 51. The upper vent holes 52a are formed at four locations surrounding the seat member 55. The diameter of the upper vent holes 52a can be established from 1.5 to 3 mm. The passage length of the upper vent holes 52a can be established from 1.5 to 2.5 mm, in consideration of the wall thickness of the upper wall 51a of the float 51. Here, the lower limits for diameter and passage length of the upper vent holes 52a will be established in consideration of avoiding blockage of the upper vent holes 52a by the surface tension of the fuel; meanwhile, as will be discussed later, the upper limits thereof will be established in consideration of their function as discharge paths for vapors depending on the rate of rise in fuel level. A side communication hole 52b is formed in the side wall 51b of the float 51. Here, the side communication hole 52b has a passage area greater than that of the upper vent holes 52a, and as shall be discussed later is designed to function as a discharge path for vapors from the float chamber 51S to the valve chamber 30S.

The seat member 55 is supported in a valve support aperture 53 which is formed in the center of the upper part of the float 51. The seat member 55 is formed from flexible material (e.g. a rubber material or thermoplastic elastomer material), and comprises a disk-shaped seat portion 55a, a seat support portion 55b of rod shape projecting down from the center lower part of the seat portion 55a, and a detent portion 55c formed midway along the seat support portion 55b. The seat support portion 55b is press-fit into the valve support aperture 53 and attached to the upper part of the float 51 by disposing the detent portion 55c so as to engage the peripheral edge of the valve support aperture 53.

The spring 70 is positioned within the float chamber 51S of the float 51. The spring 70 is interposed between one end of the float 51 and the spring support portion 35e of the base plate 35, thereby urging the float 51 upward.

Figure 4:
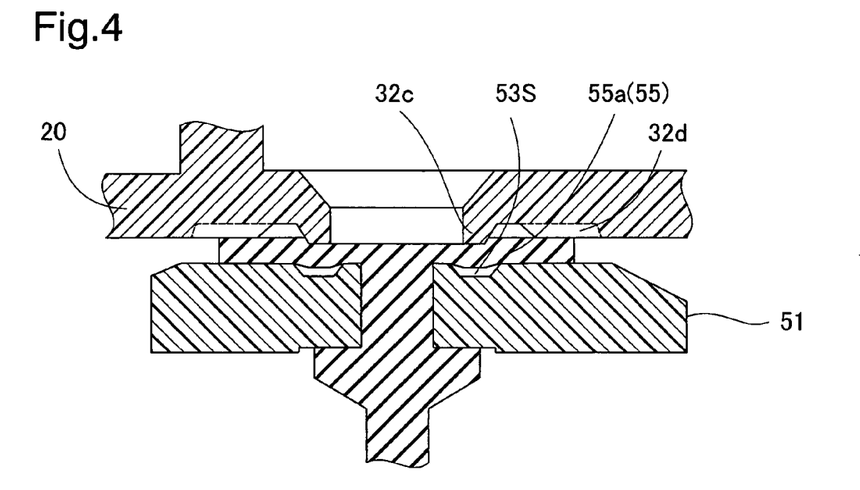
FIG. 4 is an enlarged sectional view of the area around the seal portion and the seat member.

FIG. 4 is an enlarged sectional view of the area around the seal portion 32c and the seat member 55. In the area around the seal portion 32c and the seat member 55 is disposed a mechanism for inducing flexural depression of the flexible seat member 55, as well as regulating the extent of flexural depression to no more than a prescribed level. Specifically, a flexural depression-enabling recess 53S is formed on the upper part of the float 51. The flexural depression-enabling recess 53S is formed at a location in opposition to the seal portion 32c, so as to enable the seat portion 55a to undergo flexural depression when the seat portion 55a pressed by the seal portion 32c. Here, the flexural depression-enabling recess 53S is of a width such that even if the casing 20 and the float 51 are inclined relative to one another, one end of the seat portion 55a which is the first part of the seat portion 55a to come into abutment against the seal portion 32c can undergo flexural depression into the flexural depression-enabling recess 53S (see FIG. 10). As shown in FIG. 3, liquid discharge slots 53Sa are formed at three locations in the circumferential direction at the outside perimeter of the flexural depression-enabling recess 53S, for discharge of fuel which has collected within the flexural depression-enabling recess 53S and facilitate flexural depression of the seat member 55.

Figure 5:
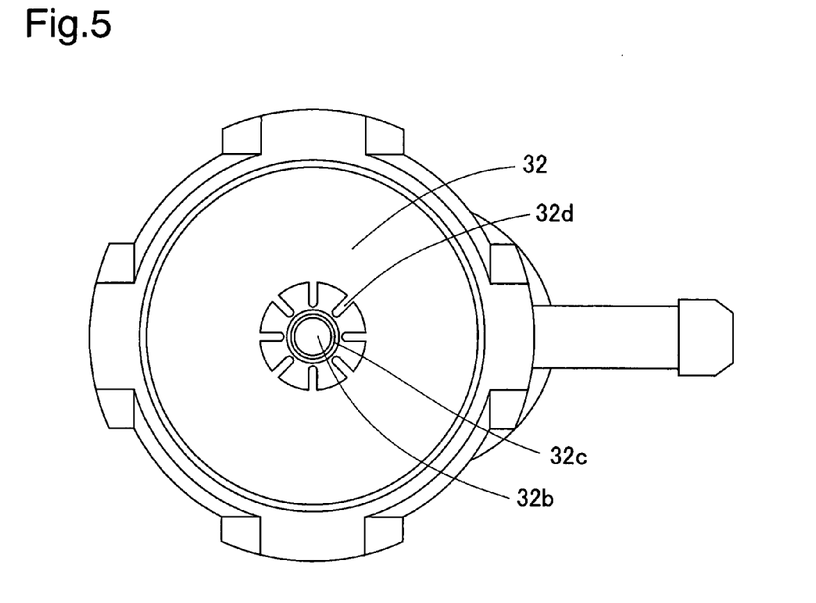
FIG. 5 is a bottom view of the casing body.

FIG. 5 shows the seal portion 32c formed on the upper wall 32, shown viewed from below. On the outside perimeter of the seal portion 32c is formed a regulating portion 32d for regulating the level of flexural depression of the seat portion 55a. The regulating portion 32d is divided into multiple parts (at eight locations in FIG. 5) arranged in annular configuration; as depicted in FIG. 4, the regulating portion 32d regulates the extent of flexural depression of the seat portion 55a by pressing the outside peripheral portion of the seat member 55.

(3) Operation of Fuel Cutoff Valve 10

(3)-1 Operation of Fuel Cutoff Valve 10 when Large Rising Flow Occurs

Figure 6:
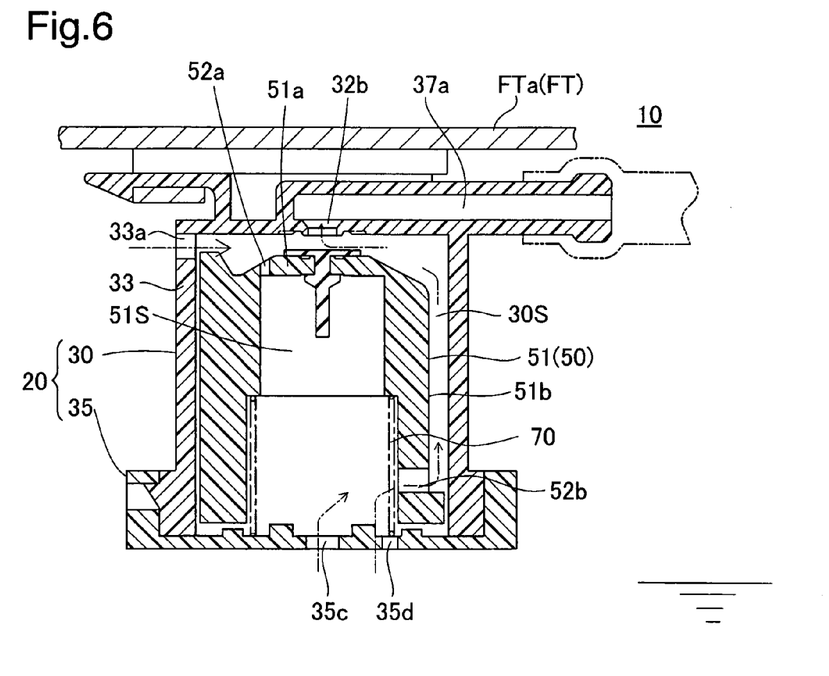
FIG. 6 shows the operation of the fuel cutoff valve.

FIG. 6 shows the operation of the fuel cutoff valve 10. With the fuel tank FT close to the full tank level and the fuel cutoff valve 10 in the open state, a sudden incline of the fuel tank, or the occurrence of excess fuel vapors, may cause accumulated vapors in the upper part of the fuel tank FT to produce a rising flow which enters the valve chamber 30S through the vent hole 33a in the side wall 33, as well as entering into the float chamber 51S of the float 51 through the basal communicating holes 35c, 35d of the base plate 35, with the vapors subsequently passing through the side communication hole 52b and escaping through the gap between the outside periphery of the float 51 and the inside wall of the casing body 30, and thence escaping from this gap through the connecting passage 32b and the pipe passageway 37a, and towards the canister end. At this same time, since the vapor flow entering the float chamber 51S of the float 51 escapes from the side communication hole 52b, a high level of force that would cause the float 51 to rise does not develop; and since the passage area of the connecting passage 32b is smaller than the passage area of the side communication hole 52b, the rising force of the float 51 is held in check by a rise in pressure in the upper part of the valve chamber 30S. Consequently, if large rising flow should occur, the fuel cutoff valve 10 will ensure venting of vapors to the outside, without the fuel tank FT becoming blocked off.

(3)-2 Operation of Fuel Cutoff Valve 1 During Sway of Vehicle

Figure 7:
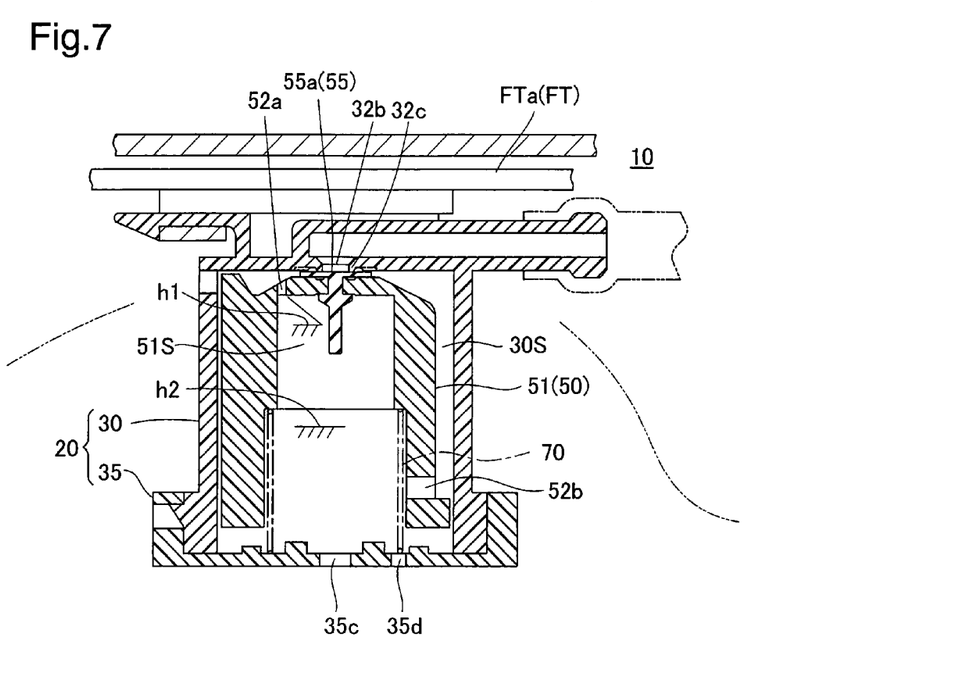
FIG. 7 shows the operation of the fuel cutoff valve during sway of the vehicle.
Figure 8:
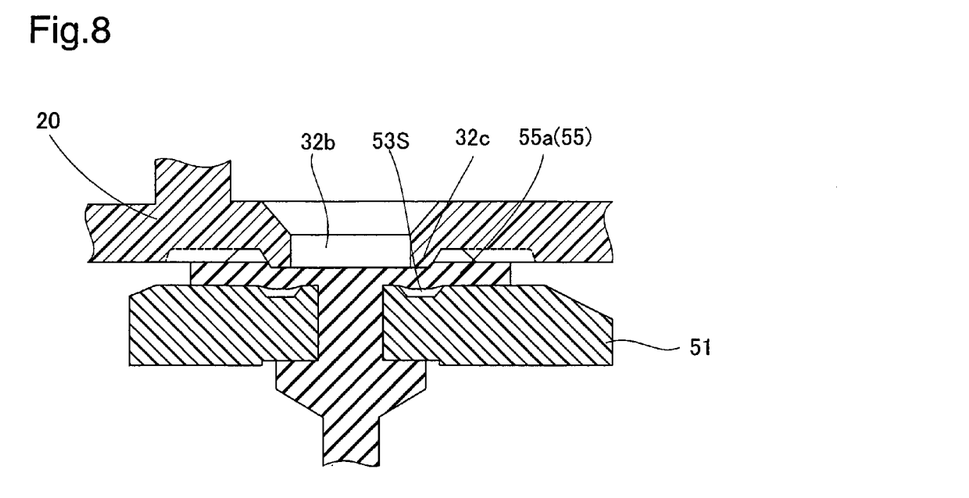
FIG. 8 shows fragmentary view of FIG. 7.

FIG. 7 shows the operation of the fuel cutoff valve 10 during sway of the vehicle. With the fuel level at a location close to full tank level, in the event that the fuel tank FT should sway due to sudden turning of the vehicle, the liquid level within the fuel tank FT will surge as shown by the double-dot and dash line in FIG. 7. The fuel will flow into the float chamber 51S of the float 51 via the basal communicating holes 35c, 35d of the base plate 35. At this time, due to the rapid rate of rise of the fuel level in combination with the small amount of vapors escaping through the upper vent hole 52a of the float, the buoyancy created by the vapors collecting within the float chamber 51S becomes appreciable. When the fuel level in the float chamber 51S reaches a certain height h2 and the buoyancy and upward force of the spring 70 overcome the weight of the float 51, the float 51 bobs upward. Due to rising of the float 51 the seat member 55 now becomes seated in the seal portion 32c and closes off the connecting passage 32b. Thus, the fuel can be prevented from flowing out from the fuel tank FT during sharp turning of the vehicle. As shown in FIG. 8, in this closed state, when the rubber seat member 55 becomes seated against the seal portion 32c, the portion pressed by the seal portion 32c undergoes elastic deformation towards the flexural depression-enabling recess 53S on the upper part of the float 51. Consequently, the seat portion 55a, under pressure by the small-diameter seal portion 32c, undergoes flexural depression so as to come into intimate contact with it. Then, once the regulating portion 32d comes into abutment against the seat portion 55a, further flexural depression by the seat portion 55a is regulated.

(3)-3 Operation of Fuel Cutoff Valve 1 with the Vehicle Inclined

Figure 9:
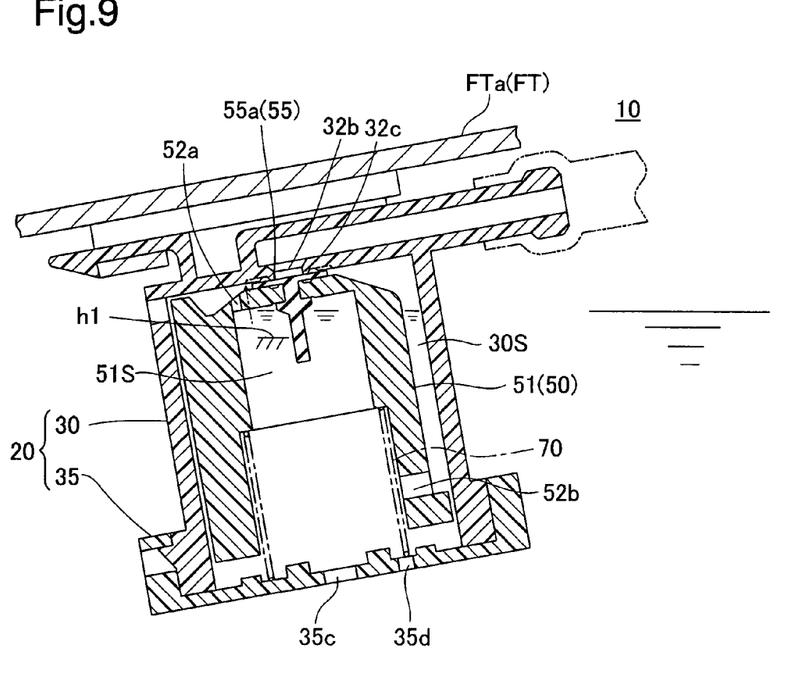
FIG. 9 shows the operation of the fuel cutoff valve with the vehicle inclined.
Figure 10:
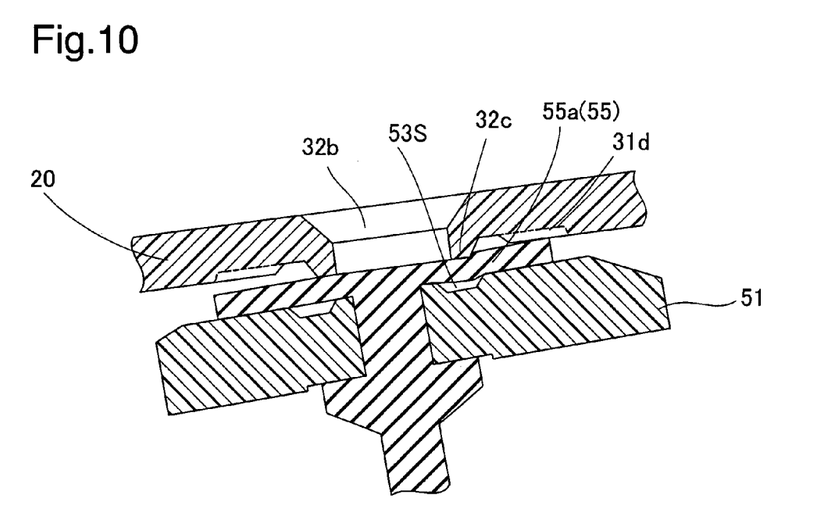
FIG. 10 shows fragmentary view of FIG. 9.

FIG. 9 shows the operation of the fuel cutoff valve 10 with the vehicle inclined. If the one wheel of the vehicle should ride up over the curb, or if the vehicle should incline on a sloping roadway such as hill, a gradual rise in fuel level in the fuel tank FT will be produced. When the fuel level reaches the fuel cutoff valve 10 and then rises further, the fuel will flow into the valve chamber 30S through the basal communication holes 35c, 35d in the base plate 35. Since the rate of rise of the fuel level at this time is not particularly fast, despite the rise in fuel level, vapors within the float chamber 51S will be discharged through the upper vent hole 52a, and the fuel will flow into the float chamber 51S without rising of the float 51. Then, as the fuel level exceeds a prescribed level and reaches a certain height h1 within the float chamber 51S of the float 51, the float 51 will rise due to the buoyancy thereof, whereupon the seat portion 55a of the seat member 55 becomes seated in the seal portion 32c and closes off the connecting passage 32b. As shown in FIG. 10, even if the float 51 should become seated in an inclined state on the seal portion 32c at this time, high sealing property will be attained due to elastic deformation of the seat portion 55a in response to the seal portion 32c. Moreover, since the flexural depression-enabling recess 53S has been designed with a width such that even if the casing 20 and the float 51 are inclined relative to one another, one end of the seat portion 55a (the portion at right in the drawing) initially comes into abutment against the seal portion 32c, one end of the seat portion 55a can undergo flexural depression into the flexural depression-enabling recess 53S. Then, when the fuel level in the fuel tank FT drops, the float 51 declines in buoyancy and descends, opening up the connecting passage 32b.

(4) Operation and Effects of the Embodiment

The constitution of the embodiment discussed above affords the following effects.

(4)-1 As depicted in FIG. 8, when the rubber seat member 55 is seated on the seal portion 32c, the portion pressed by the seal portion 32c undergoes elastic deformation towards the interior of the flexural depression-enabling recess 53S in the upper portion of the float 51. The flexural depression-enabling recess 53S is formed with inside diameter larger than the outside diameter of the seal portion 32c, and at this time functions as a space to enabling the seal portion 32c to enter, reliably bringing about elastic deformation of the seat portion 55a. Consequently, under pressure by the small-diameter seal portion 32c the seat portion 55a undergoes elastic deformation producing intimate contact, so that high sealing property is achieved even when subjected to vibration of the vehicle.

(4)-2 As depicted in FIG. 10, even if the float mechanism 50 should become seated with the seat portion 55a in an inclined state on the seal portion 32c, high sealing property will be attained due to elastic deformation of the seat portion 55a in response to the seal portion 32c. Moreover, since the flexural depression-enabling recess 53S has been designed with a width such that even if the casing 20 and the float 51 are inclined relative to one another, one end of the seat portion 55a initially comes into abutment against the seal portion 32c, one end of the seat portion 55a can undergo flexural depression into the flexural depression-enabling recess 53S.

(4)-3 With the seat portion 55a of the seat member 55 elastically deformed and seated on the seal portion 32c, the upper surface of the seat portion 55a comes into abutment against the regulating portion 32d regulating the upward movement of the float 51, and thus the seat portion 55a will not be stretched to any further extent by the seal portion 32c.

That is, the regulating portion 32d, by means of regulating the level of elastic deformation of the seat portion 55a, prevents the seat portion 55a from being subjected repeatedly to high levels of elastic deformation, thus affording outstanding endurance, as well as preventing the seat portion 55a from damage by being clamped between the floor of the flexural depression-enabling recess 53S and the seal portion 32c.

(4)-4 As depicted in FIG. 5, since the regulating portions 32d are disposed at an interval in the circumferential direction about the seal portion 32c, the area of contact between the rubber seat member 55 and the regulating portions 32d may be kept small, preventing locking or sticking.

(4)-5 Simply by inserting the seat support portion 55b into the valve support aperture 53, the seat member 55 can be easily mounted onto the float 51 and detained by the detent portion 55c.

(4)-6 Since the seat portion 55a undergoes flexural depression into the flexural depression-enabling recess 53S produced by recessing a portion of the upper surface of the float 51, obviating the need to provide a gap between the upper surface of the float 51 and the seat portion 55a for the purpose of enabling flexural depression, bulkiness in the height direction of the float mechanism 50 can be avoided, contributing to a more compact design.

(4)-7 Since the seat member 55 is attached to the float 51 in a stable attitude in contact against the upper surface of the float 51, a high degree of surface accuracy of the seal face of the seat portion 55a against the seal portion 32c is possible, and thus sealing property can be improved.

The invention is not limited to the preceding embodiment, and can be reduced to practice in various other forms without departing from the spirit thereof. For example, the following modifications are possible.

In the preceding embodiment, the fuel cutoff valve was installed on the inside of the fuel tank, i.e. a so-called in-tank design, but is not limited thereto and may be adapted as well to arrangements wherein the valve is welded to the upper face of the upper wall of the fuel tank, with its bottom part being inserted through a mounting hole.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel cutoff valve that is mounted on an upper wall of a fuel tank and opens and closes a connecting passage to connect the fuel tank and outside, the fuel cutoff valve comprising:
   a casing having (i) a valve chamber, which is formed by an upper wall and a side wall (ii) a connecting passage-forming projection, which projects downward from a center portion of the upper wall and is perforated by the connecting passage, which connects to the valve chamber, and (iii) a seal portion located to face the connecting passage and formed on a lower end of the connecting passage-forming projection in an annular configuration; and
   a float mechanism having (i) a float that is housed within the valve chamber and rises and falls according to a fuel level within the valve chamber, and (ii) a seat member that is installed on an upper portion of the float and has a seat portion formed of flexible material for opening and closing the connecting passage, wherein
   the float includes a flexural depression-enabling recess situated on the upper portion of the float at a location in opposition to the seal portion for enabling the seat portion to undergo flexural depression when the seat portion is pressed by the seal portion,
   the casing has a regulating portion formed on an outer circumference of the seal portion, for regulating a level of elastic deformation at which the seat portion elastically deforms into the flexural depression-enabling recess,
   the regulating portion is configured to abut against the upper surface of the seat portion for regulating the upward movement of the float, when the seat portion of the seat member is elastically deformed and seated on the seal portion,
   the regulating portion surrounds the seal portion and is configured to contact an outermost peripheral part of the seat portion, and
   wherein the seat member is fixed to the float mechanism so that the seat member moves vertically together with the float, and
   wherein the seat member is fitted into a hole formed in a center of the float.

2. The fuel cutoff valve in accordance with claim 1, wherein the regulating portion includes a plurality of projections that are disposed to encircle an outer circumference of the seal portion.

3. The fuel cutoff valve in accordance with claim 2, wherein the projections are disposed at an interval and in the circumferential direction about the seal portion.

4. The fuel cutoff valve in accordance with claim 1, wherein the seat portion is configured to contact an upper surface of the float.

5. The fuel cutoff valve in accordance with claim 1, wherein the float includes a liquid discharge slot that is formed at the outside perimeter of the flexural depression-enabling recess, the liquid discharge slot being configured to discharge fuel collected within the flexural depression-enabling recess to outside of the float.

6. The fuel cutoff valve in accordance with claim 1, wherein the regulating portion includes a plurality of projections that are arranged circumferentially about the seal portion.

7. The fuel cutoff valve in accordance with claim 1, wherein the depression-enabling recess is annular and is coaxial with the seal portion.

8. The fuel cutoff valve in accordance with claim 1, wherein the seat portion is generally planar.

9. The fuel cutoff valve in accordance with claim 1, wherein the seat portion enters the flexural depression-enabling recess when pressed by the seal portion when the seat portion contacts the seal portion as a result of upward movement of the float.

10. A fuel cutoff valve that is mounted on an upper wall of a fuel tank and opens and closes a connecting passage to connect the fuel tank with an outside space, the fuel cutoff valve comprising:
   a casing that includes
      a valve chamber, which is formed by an upper wall and a side wall and which connects the fuel tank interior to the connecting passage,
      a connecting passage-forming projection, which projects downward from a center portion of the upper wall and is perforated by the connecting passage, which connects with the valve chamber, an annular seal portion, which surrounds the connecting passage, projects towards the valve chamber, and is formed on a lower end of the connecting passage-forming projection; and a float mechanism that includes
- a float, which is housed within the valve chamber and rises and falls according to a fuel level within the valve chamber, and
- a seat member, which is fixed to an upper portion of the float and has a seat portion formed of flexible material for opening and closing the connecting passage, wherein the float includes an annular recess situated on the upper portion of the float in opposition to the seat portion for permitting the seat portion to flex and enter the annular recess when the seat portion is pressed by the seal portion, the annular recess generally corresponds in shape to the projection of the seal portion, and a lower surface of the seal portion faces a bottom surface of the annular recess, the seat portion flexes and is pressed into the annular recess when the seat portion contacts the seal portion as a result of upward movement of the float, the casing has a regulating portion formed on an outer circumference of the seal portion, for regulating a level of elastic deformation at which the seat portion elastically deforms into the flexural depression-enabling recess, the regulating portion is configured to abut against the upper surface of the seat portion for regulating the upward movement of the float, when the seat portion of the seat member is elastically deformed and seated on the seal portion, and the regulating portion surrounds the seal portion and is configured to contact an outermost peripheral part of the seat portion.

11. The fuel cutoff valve in accordance with claim 10, wherein the regulating portion includes a plurality of projections that are arranged circumferentially about the seal portion.

12. The fuel cutoff valve in accordance with claim 10, wherein the seat portion is generally planar.

* * * * *